United States Patent [19]
Nakamura

[11] Patent Number: 5,115,357
[45] Date of Patent: May 19, 1992

[54] IMAGE FORMING RECORDING DEVICE CAPABLE OF CARRYING OUT FRAME OR FIELD RECORDING

[75] Inventor: Kenji Nakamura, Osaka, Japan

[73] Assignee: Minolta Camera Kabushiki Kaisha, Osaka, Japan

[21] Appl. No.: 715,889

[22] Filed: Jun. 18, 1991

Related U.S. Application Data

[63] Continuation of Ser. No. 563,947, Aug. 7, 1990, abandoned, which is a continuation of Ser. No. 139,750, Dec. 30, 1987, abandoned.

[30] Foreign Application Priority Data

Jan. 6, 1987 [JP] Japan ..................... 62-951

[51] Int. Cl.⁵ .................. G11R 5/55; H04N 5/781
[52] U.S. Cl. ..................... 360/75; 360/35.1; 360/78.04; 358/342; 358/906
[58] Field of Search ............ 360/77.02-77.11, 360/78.04-78.14, 75, 69, 35.1, 11.1; 358/335, 342, 906, 909

[56] References Cited

U.S. PATENT DOCUMENTS

| | | | |
|---|---|---|---|
| 4,746,993 | 5/1988 | Tada | 358/335 |
| 4,772,962 | 9/1988 | Tanaka et al. | 360/35.1 |
| 4,819,093 | 4/1989 | Okada et al. | 360/78.06 |
| 4,825,324 | 4/1989 | Miyake et al. | 360/35.1 |

FOREIGN PATENT DOCUMENTS

| | | | |
|---|---|---|---|
| 58-188973 | 11/1983 | Japan | 358/342 |
| 59-23685 | 2/1984 | Japan | 360/35.1 |
| 60-219879 | 2/1985 | Japan | |
| 60-105383 | 6/1985 | Japan | 360/35.1 |

OTHER PUBLICATIONS

Manual for Video Floppy Recorder, Matsushita Denki Sangyo Kabushiki Kaisha, Nov., 1986.

Primary Examiner—Aristotelis Psitos
Assistant Examiner—Steven R. Garland
Attorney, Agent, or Firm—Burns, Doane, Swecker & Mathis

[57] ABSTRACT

A magnetic recording device capable of executing frame recording with use of a pair of adjacent magnetic heads has a signal detection circuit for determining whether a given track is unrecorded based on signal reproduced by the magnetic head, a head feeding mechanism, a controller for controlling the head feeding mechanism, the controller allowing the magnetic head to move until two adjacent unrecorded tracks are detected in the frame recording mode.

11 Claims, 7 Drawing Sheets

IMAGE FORMING RECORDING DEVICE CAPABLE OF CARRYING OUT FRAME OR FIELD RECORDING

This application is a continuation of application Ser. No. 07/563,947 filed Aug. 7, 1990, abandoned which is a continuation of application Ser. No. 07/139,750 filed Dec. 30, 1987 abandoned.

BACKGROUND OF THE INVENTION AND RELATED ART STATEMENT

The present invention relates to a magnetic recording device for recording image signals on a magnetic disk having a multiplicity of concentric annular tracks thereon.

An electronic still camera for recording image signals on such a magnetic disk is able to perform a frame recording for recording image signals concerning a single image on two adjacent tracks of the disk and a field recording for recording image signals concerning a single image on a single track of the disk. Additionally, in such an electronic still camera, image signals can be recorded on one single magnetic disk by selecting the frame recording mode and the field recording mode alternatively. Accordingly, it will be understood that the frame recording is made on some tracks and field recording is made on some tracks. The frame recording and field recording are made at random on the magnetic disk. Moreover, in such a camera, since recording and erasing can be executed to a desirable track, there is a possibility that an unrecorded track may be situated between recorded tracks of the disk.

It is known that, for example, when being recorded on an unrecorded track between recorded tracks in a mode of the frame recording, fresh image signals may be written over the recorded tracks adjacent to the unrecorded track, (which is termed as "double recording"). A prior art is disclosed in Japanese Unexamined Patent Publication No. 219879/1985 in which, when erasing perviously recording signals and recording fresh signals, the recording mode is automatically set in the same recording mode as the previous recording. Another prior art is disclosed in Japanese Unexamined Patent Publication No. 105383/1985 in which, when recording on the last 50 tracks of the disk, the recording mode is automatically changed to the field recording mode. However, the prevention of double recording is not depicted in both prior arts.

In the prior art devices, there is a problem that, when being recorded on an unrecorded track randomly situated between recorded tracks of the magnetic disk, particularly, in the frame recording mode, fresh signals are written over the recorded track adjacent to the unrecorded track.

SUMMARY OF THE INVENTION

It is a first object of the present invention to provide a magnetic recording device for recording image signals with the use of one or both of a pair of adjacent magnetic heads on a desirable track of a magnetic disk having a plurality of concentric annular recording tracks which assures optimum utilization of unrecorded tracks randomly left on the magnetic disk.

It is a second object of the present invention to provide a magnetic recording device which makes it possible to execute a field recording on an unrecorded track situated between two adjacent recorded tracks free of double recording when the device is operated in a frame recording mode.

It is a further object of the present invention to provide a magnetic recording device which requires the operator only to select a field recording or a frame recording when being informed by a warning signal indicating that the recording mode is changed from a frame recording to the field recording and eliminates changing of the frame and field recording modes and checking of tracks on the disk.

To achieve the objects, a magnetic recording device according to the present invention comprises a magnetic disk having a multiplicity of concentric annular tracks in which one track is assigned to one field of a single image, and a magnetic head member for recording image signal on the magnetic disk and reproducing image signal recorded on the magnetic disk so as to enable frame recording in which a single image is recorded on adjacent two tracks of the magnetic disk by the magnetic head member, the improvement comprising signal detection means for detecting whether a given track is unrecorded based on signal reproduced by the magnetic head member, head feeding means for moving the magnetic head member in a radial direction of the magnetic disk and a controller for allowing the magnetic head member to move every track one by one until the signal detection means detects adjacent two unrecorded tracks so as to enable the frame recording.

Accordingly, a magnetic recording device of the present invention enables frame recording to automatically execute without double recording and assures optimum utilization of unrecorded tracks randomly left on the magnetic disk.

DETAILED DESCRIPTION OF PREFERRED EMBODIMENT OF THE INVENTION

Figure 1:
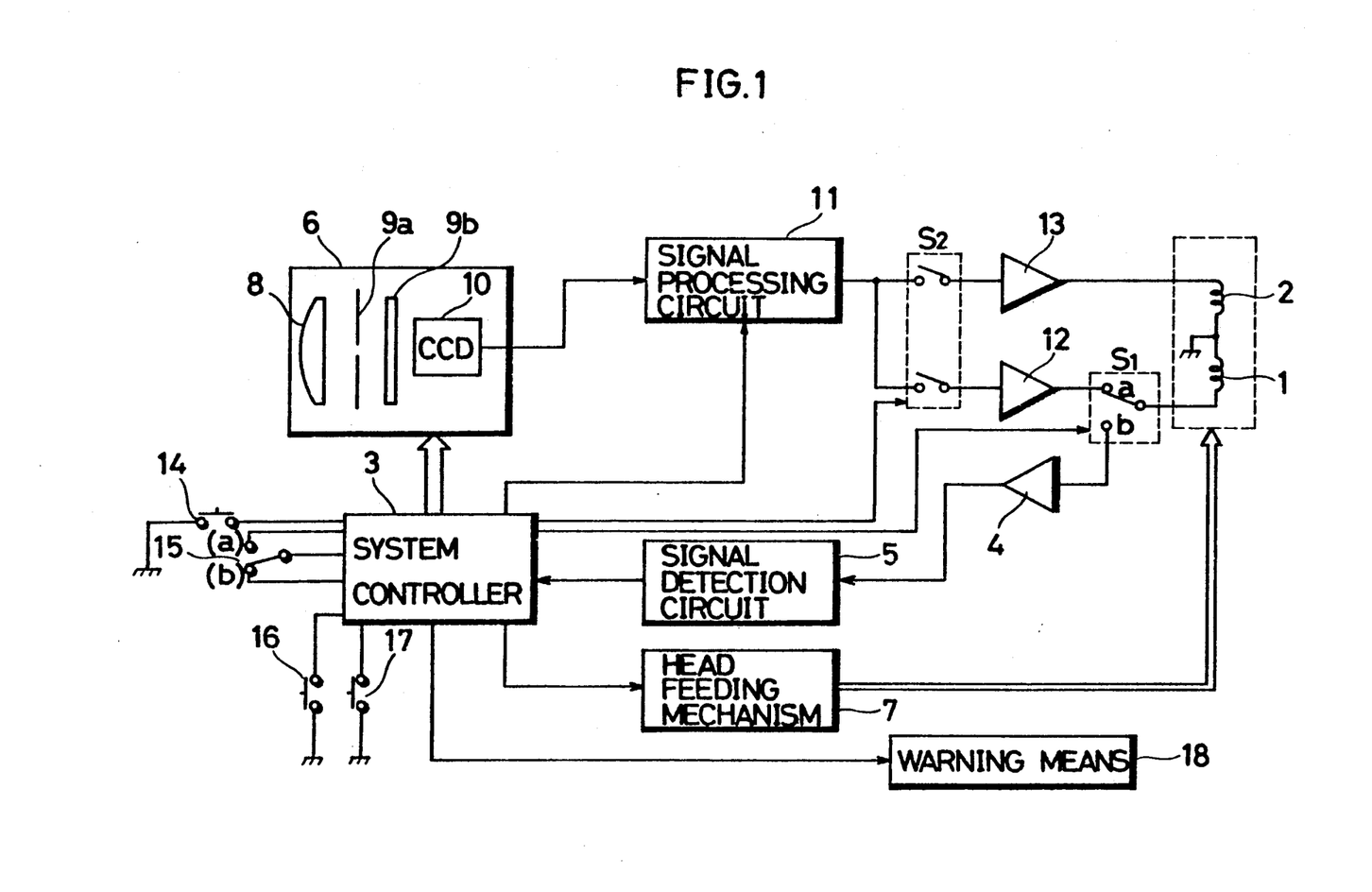
FIG. 1 is a block circuit diagram of a magnetic recording device of the present invention.

FIG. 1 is a block circuit diagram of an embodiment according to the present invention. The numerals 1 and 2 are magnetic heads for recording image signals in two adjacent tracks, referred to hereinafter as an inner circle head (I.C.H.) 1 and an outer circle head (O.C.H.) 2, which are rendered to come in contact with a magnetic disk along its tracks referred to as an inner circle track (I.C.T.) and an outer circle track (O.C.T.) respectively. The heads 1 and 2 are generally arranged in in-line relation ship to form an integral head unit having a magnetic shield plate between the heads. When a system controller 3 causes a switch S1 to turn to "b" position, the inner circle head 1 reproduces an image signal on the inner circle track to transfer the unrecorded-state of the inner circle track through a reproducing amplifier 4 and a signal detecting circuit 5 to a system controller 3. On the other hand, when the switch S1 is turned to "a" position, the inner circle head 1 is enabled to record an image signal in the inner circle track on the disk in a frame recording mode. In the case of a field recording mode, recording is made only by the outer circle head 2. During this operation, the switch S1 is simultaneously turned to "b" position when the head is fed inwardly of the disk. After a recorded state in the inner circle track is detected, the switch S1 is turned to "a" position, so that a photographing section 6 is placed in a release permission state. The head unit is fed by means of a head feeding mechanism 7 which is actuated by a drive signal from the system controller 3 including a microcomputer. The photographing section 6 comprises an objective lens 8, an aperture diaphragm 9a, a CCD image sensor 10 to which an object to be photographed are imaged. Image signals from the CCD 10 are processed in a signal processing circuit 11 and are transmitted through a switch S2 and recording amplifiers 12, 13 directly to the outer circle head 2 and to the inner circle head 1 via the switch S1.

The system controller 3 has on the input side thereof a release switch 14, a selector switch 15 for alternatively selecting a field/frame recording automatic changing mode and a fixed mode, a manually operable head feeding switch 16, and a recording mode changing switch 17. The system controller 3 controls the photographing section 6, the signal processing circuit 11, the head feeding mechanism 7, the switch S1, the timing switch S2 for the frame recording mode, and a warning means 18 respectively.

The recording mode changing switch 17 is a pushbutton switch. The system controller 3 can alternately be changed to the frame recording mode or to the field recording mode with every pressing the switch 17. When the frame recording mode is selected in the automatic changing mode, the system controller 3 may be changed to the field recording mode in accordance with the state of an unrecorded track on the disk.

The selector switch 15 gives an operator an occasion for selecting a function of double recording prevention. In the automatic changing mode, this function allows the operator to operate the electronic still camera, with ease, without considering the prevention of double recording which requires intricate control over tracks on the disk and the frame/field recording modes. Additionally, in the fixed mode, the operator can set the frame/field recording mode and control the track with the double recording prevention being held. More specifically, in the automatic changing mode, if there is a solitary unrecorded track on the disk in the frame recording mode and the frame recording cannot be performed, the field recording is automatically selected so as to allow an image signal to record in an unrecorded track free of the double recording. At this time, a change of the recording mode is notified by the warning means 18. Therefore, if desiring, the operator can suspend the automatic changing mode by manipulating the frame/field recording changing switch 17 so that the head unit can be fed to a track on the disk in which the frame recording mode is available. In the fixed mode, the head unit is fed to a track in which the double recording is prevented by manipulating the manually operable head feeding switch 16. The warning means 18 produces audible or visual notification and is put into operation by a drive signal from the system controller 3.

Figure 2:
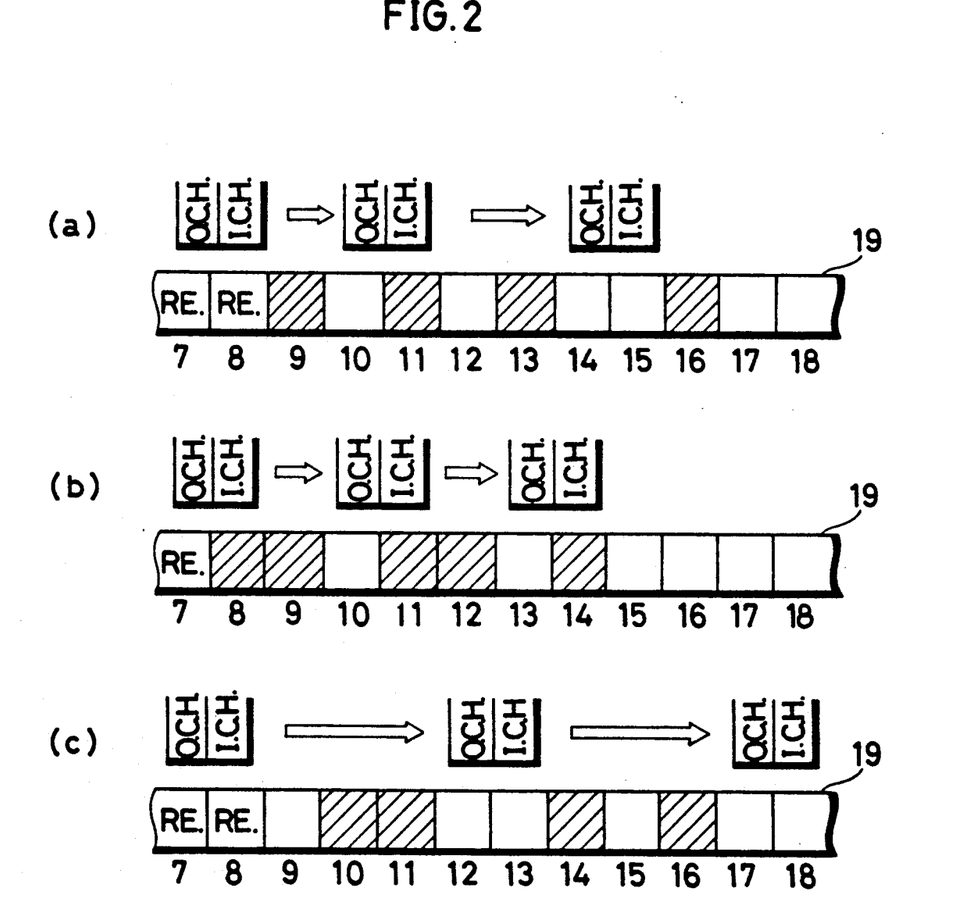
FIGS. 2(a), 2(b), and 2(c) are diagrams schematically illustrating an operation of the device.

FIG. 2 schematically illustrates the relation between the tracks on the magnetic disk 19 and the motion of the heads 1, 2 in each mode selected by the selector switch 15, wherein the numerals 7, 8, 9, ..., 18 beneath the disk 19 represent the track number. FIG. 2a shows the automatic changing mode in which the selector switch 15 is connected to a contact "a". FIG. 2b shows the fixed mode in which the selector switch 15 is connected to a contact "b" and the field recording mode is selected by the changing switch 17. FIG. 2c shows the fixed mode in which the frame recording mode is selected by the changing switch 17. The obliquely lined tracks represent the recorded track.

The operation of the automatic changing mode shown in FIG. 2a will be described. When the frame recording is made in the 7th and 8th tracks on the magnetic disk, the heads 1, 2 move to the right (towards the center of the magnetic disk). As the 9th track holds a recorded state in this case, the head unit moves further to the 10th and 11th tracks. Since the 11th track is occupied and the 10th track is not occupied, the recording mode is automatically changed from the frame recording to the field recording unless the head unit is manually fed. At the same time, the operator is informed of the changing by the warning means 18. If a photograph is taken in this condition, the field recording is made in the 10th track on the disk by the outer circle head 2. On the other hand, if the frame recording is changed by the changing switch 17, the head unit moves to the unrecorded 14th and 15th tracks without recording an image signal in the 10th track.

In the fixed mode when the field recording mode is selected as shown in FIG. 2b, after the field recording is made in the 7th track, the head unit modes to the 10th and 11th tracks on the disk. If a photograph is taken in this condition, the field recording is made in the 10th track by the outer circle head 2. On the other hand, if the manually operable head feeding switch 16 is pressed, the head unit is fed to the 13th and 14th tracks on the disk.

In the fixed mode when the frame recording mode is selected as shown in FIG. 2c, after the frame recording is made in the 7th and 8th tracks, the head unit moves to the 12th and 13th tracks on the disk. If a photograph is taken in this condition, the frame recording is made in the 12th and 13th tracks. On the other hand, if the manually operable head feeding switch 16 is pressed, the head unit is fed to the 17th and 18th tracks on the disk.

Figure 3:
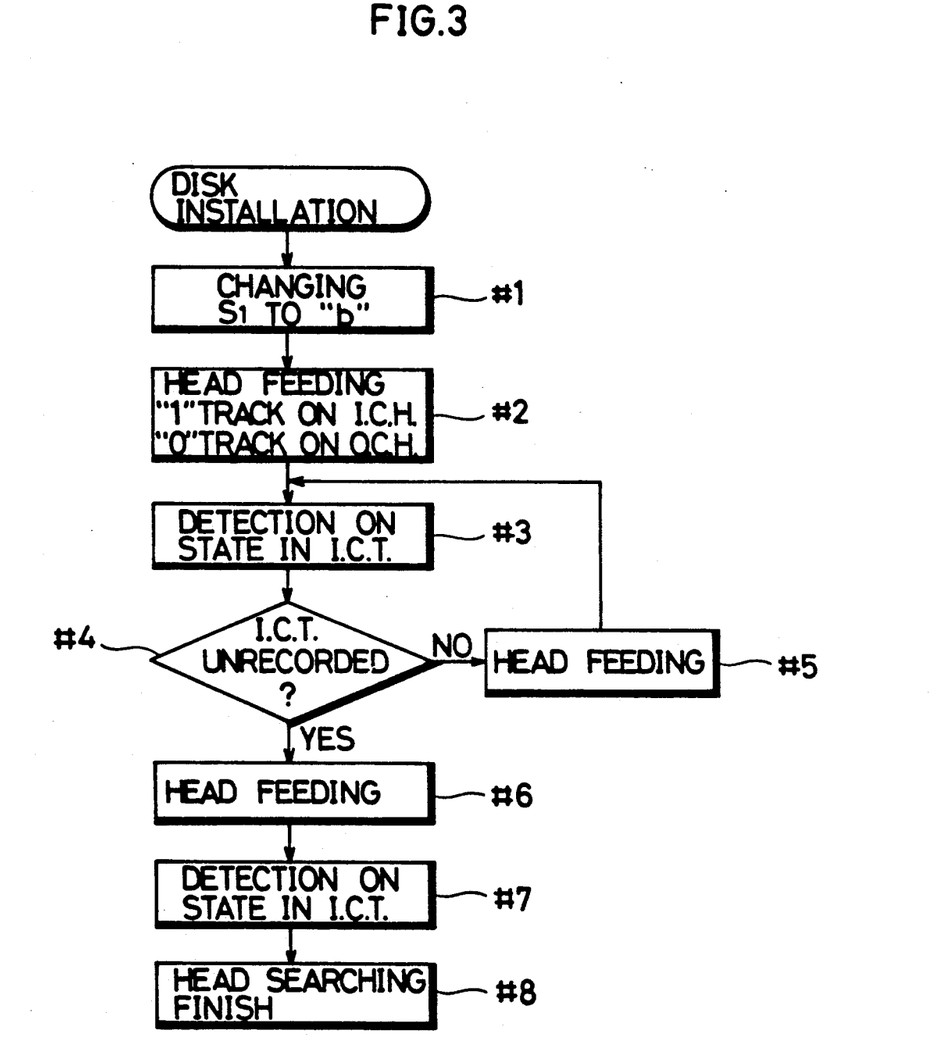
FIGS. 3, 4a, 4b, 5a, and 5b are flow charts illustrating operations of the device, wherein character A in FIG. 4a is connected to corresponding character in FIG. 4b, characters A-C in FIG. 5a are connected to corresponding characters in FIG. 5b.
Figure 4A:
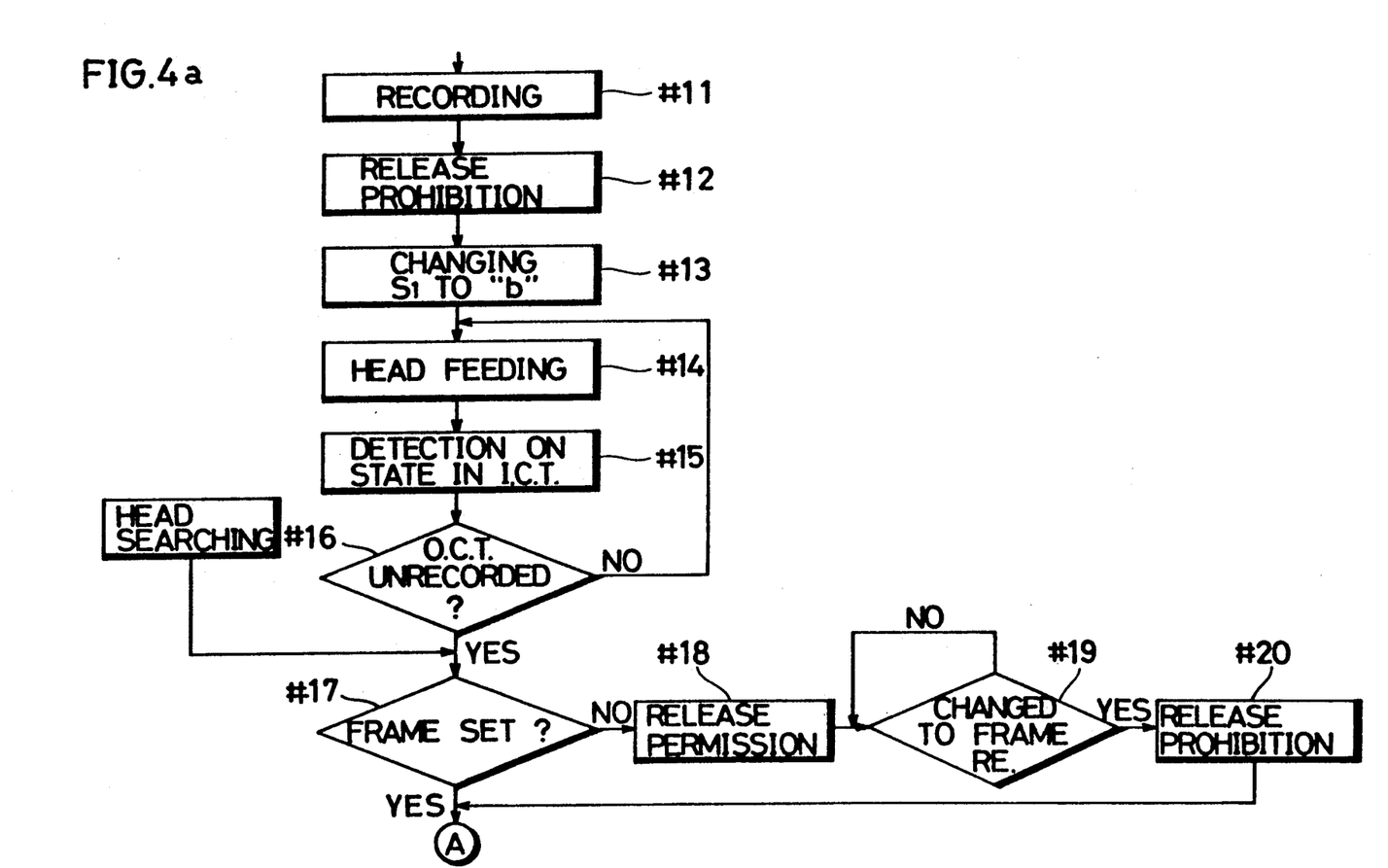
Figure 4B:
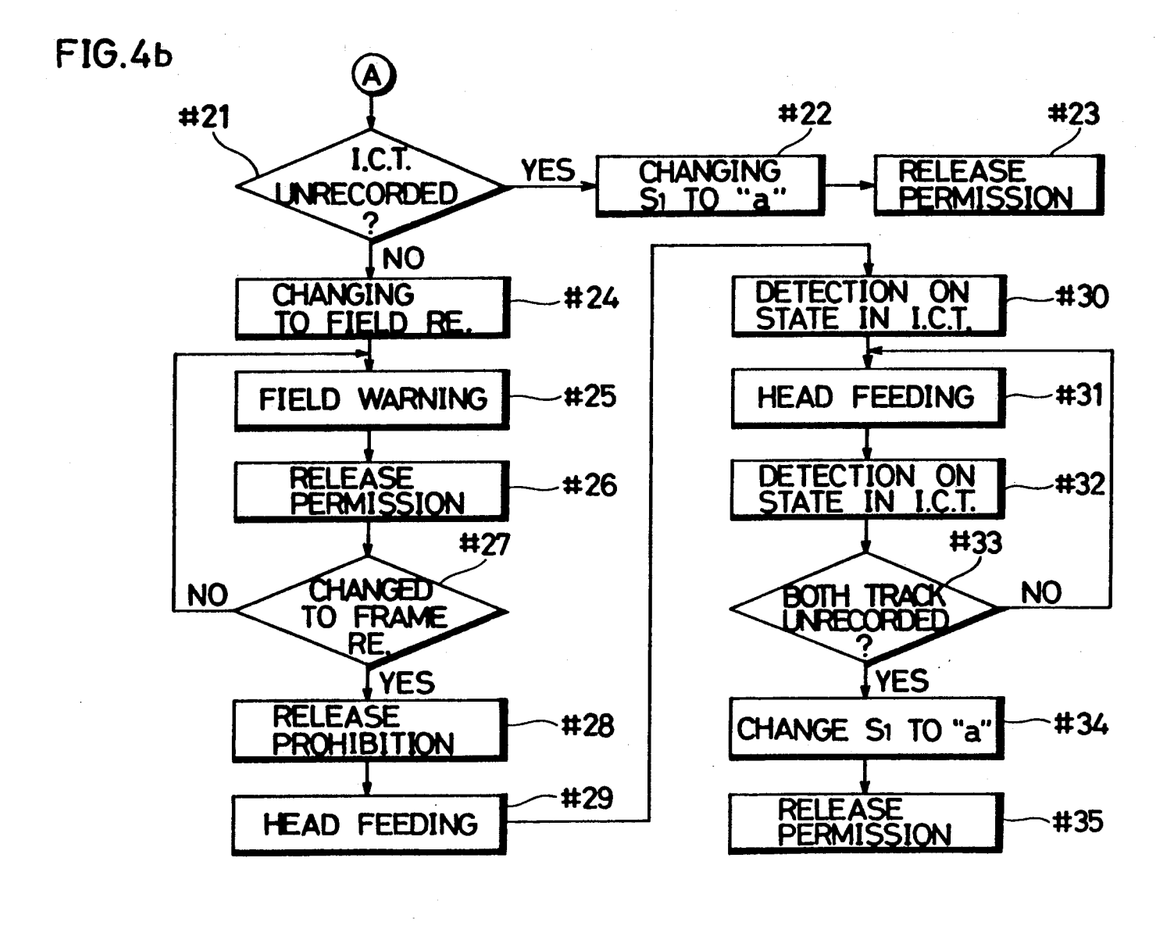
Figure 5A:
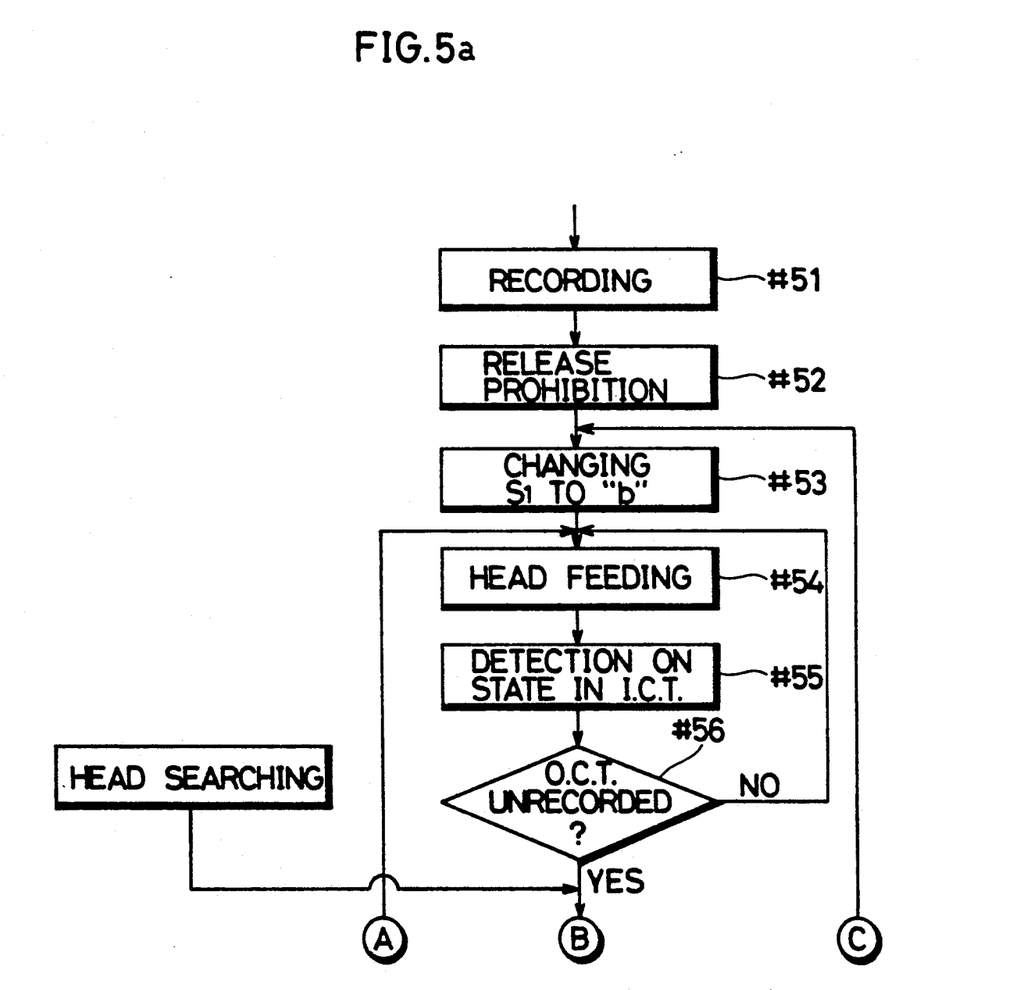
Figure 5B:
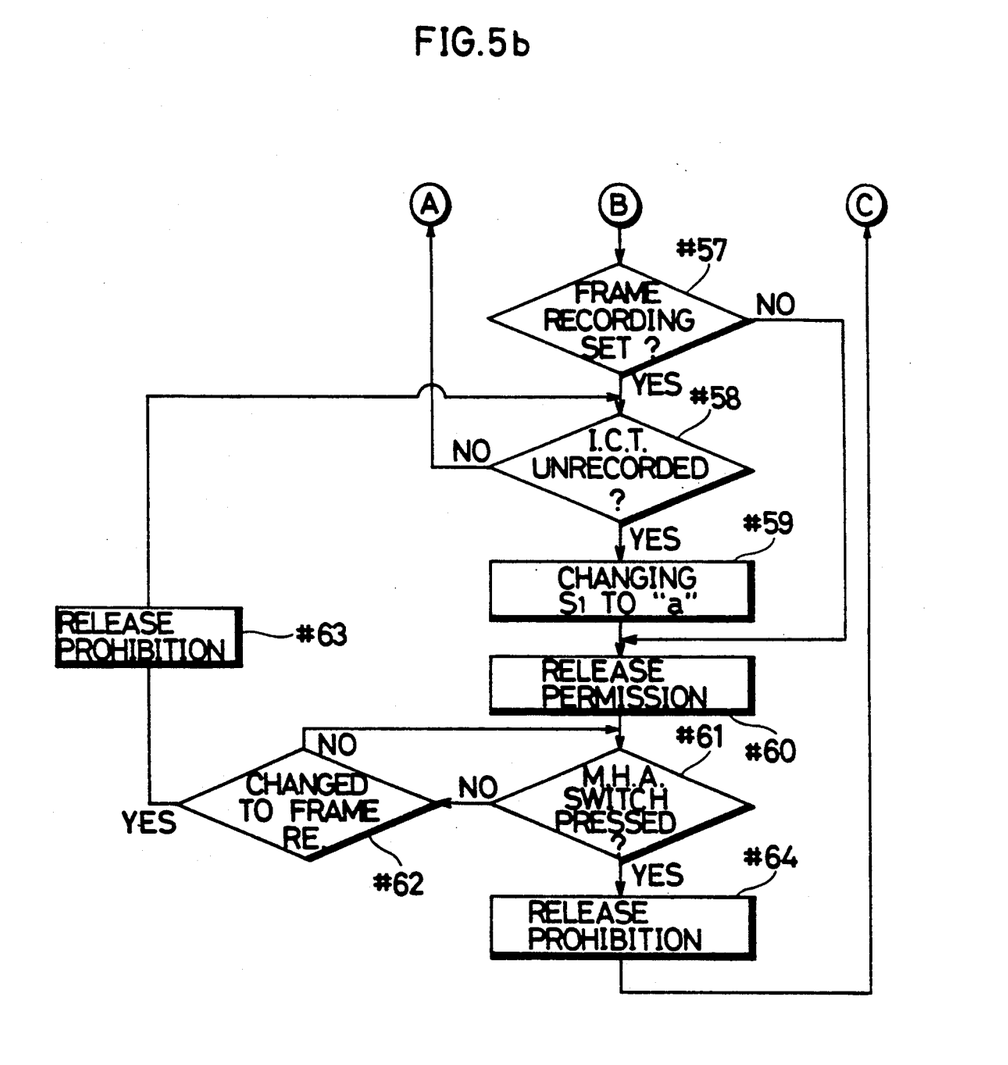

FIGS. 3 to 5 illustrate flow charts of the aforesaid operations.

FIG. 3 is a flow chart initiated by the installation of a magnetic disk. When a magnetic disk is not installed, the inner and outer circle heads 1, 2 are located at the outside of the outermost circle or first track on the disk. After the disk is installed, the system controller 3 causes the switch S1 to turn to "b" position (#1). Then, the head unit is fed one time (or one track) so as to locate the inner circle head 1 at the first track on the disk (#2). The unrecorded state in the inner circle track is detected (#3, #4). If the track is occupied by a record, the head unit is further moved inwardly and repeats the action until an unrecorded track is found (#5). When the inner circle track is not occupied, the head unit modes once more (#6) to detect the state in the next inner circle track (#7) and head searching is completed (#8). Consequently, an outer circle track is an unrecorded track. Then, steps shown in FIGS. 4 and 5 will be executed.

FIG. 4 is a flow chart showing a sequence from the recording to a release permission in the automatic changing mode. After the recording is performed (#11), the release is prohibited to operate (#12). The switch S1 is turned to "b" position (#13) and the head unit is fed inwardly of the disk (#14) so that the unrecorded state of the inwardly situated track can be detected for availability in recording (#15). If a previously checked outwardly situated track holds a record ("NO" at #16), the head unit is fed further (#14). If the outwardly situated track of two tracks is not occupied ("YES" at #16) and the recording mode is set to the field recording mode ("NO" at #17), the release is permitted to stand by for operation (#18). In the stand-by situation, if the frame recording is selected by the recording mode changing switch 17 ("YES" at #19), the release is prohibited to operate (#20) and the following process when the recording mode is set in the frame recording is executed. If the frame recording is selected ("YES" at #17) and the inwardly situated track of two tracks holds no record ("YES" at #21), the switch S1 is turned to "a" position (#22) to permit the release to stand by for operation (#23) because the two adjacent tracks on the disk are available to be recorded. Even if the inwardly situated track is occupied by a record ("NO" at #21), the field recording can be performed when being changed from the field recording by the system controller 3 (#24). The operator is simultaneously informed of the change of recording mode by the warning means 18 (#25) and then, the release is permitted to stand by for operation (#26). When wishing the frame recording, the operator manipulates the frame/field recording mode changing switch 17 so as to reset to the frame recording mode ("YES" at #27). Consequently, the release is prohibited to operate (#28) and the head unit is fed (#29) to detect inwardly situated tracks for availability (#30). Then, the head unit is fed inward (#31) to detect a further inwardly situated track on the disk for availability in recording (#32). If two consecutively situated tracks are available to be recorded ("YES" at #33), the switch S1 is turned to "a" position (#34) to permit the release to stand by for operation (#35). If not ("NO" at #33), the head unit is fed further (#31) and repeated the operation until two consecutively situated tracks are found unrecorded.

FIG. 5 is a flow chart showing a sequence from the recording to the release permission in the fixed mode. After the recording is performed (#51), the release is prohibited to operate (#52). Tge switch S1 is turned to "b" position (#53) and the head unit is fed inwardly of the disk (#54) so that an inwardly situated track can be detected for availability for recording (#55). If a previously checked outwardly situated track holds a record ("NO" at #56), the head unit is fed further (#54). When it is an unrecorded track ("YES" at #56) and the recording mode is set to the field recording ("NO" at #57), the release is permitted to stand by for operation (#60). When the frame recording is selected ("YES" at #57) and the inwardly situated track of two tracks holds no record ("YES" at #58), the switch S1 is turned to "a" position (#59) to permit the release to stand by for operation (#60). On the other hand, if an inwardly situated track is occupied by a record ("NO" at #58), the head feeding is repeated (#54). When the manually operable head feeding switch 16 is pressed ("YES" at #61) in the permitted condition of the release (#60), the release is prohibited to operate (#64) and the switch S1 is turned to "b" position to feed the head unit (#53, #54). The head unit is fed further until a track availabl for the frame or field recording mode is found. When the change from the field recording mode to the frame recording mode is made ("YES" at #62) with the manually operable head feeding switch 16 unpressed ("NO" at #61), the release is prohibited to operate (#63). Then, the operation in the frame recording mode is executed (after #58).

As mentioned above, a magnetic recording device of the present invention includes changing means for changing the recording mode to a field recording mode automatically when one of magnetic heads reaches an unrecorded track between recorded tracks on the disk during a frame recording mode, warning means for reporting that the recording mode is changed to the field recording mode by the changing means, and operation means for providing a command for changing the recording mode from the field recording mode changed by the changing means to the frame recording mode.

Accordingly, in the case of the frame recording mode, when one of the magnetic heads is located at an unrecorded track between recorded tracks on the disk, the changing means changes the recording mode to the field recording mode. Simultaneously, the warning means informs the operator of the changing operation so that the operator can select either the field recording or the frame recording mode alternatively. The operator can let the magnetic recording device operate in accordance with the field recording mode when desiring the field recording. On the other hand, when desiring the frame recording, the operator can reset the mode at the frame recording mode by actuating the operation means. When the frame recording is selected, the head is fed, without recording signals in one unrecorded track between recorded tracks, to a location on the disk where two consecutively situated unrecorded tracks are found.

According to the embodiment, the frame recording mode and the field recording mode represent frame and field photographings respectively by an electronic still camera. It is understood that the principles of the present invention is not limited to electronic still cameras and can be adopted for use in various types of magnetic recording device without departing from the scope of the invention.

What is claimed is:

1. An image recording device which records an image signal on a recording disk having a multiplicity of concentric annular recording tracks and is operable in a frame recording mode in which one frame of a single image is recorded on two adjacent tracks of the recording disk, the image recording device comprising:
   a recording head for recording and reproducing an image signal recorded on the recording disk;
   head feeding means for moving the recording head in a radial direction of the recording disk;
   a controller for controlling the head feeding means so as to move the recording head track by track when the image signal is to be recorded; and
   signal detection means for determining whether a track is unrecorded or not based on the signal reproduced by the recording head every time the recording head is moved by one track;
   wherein the controller causes the recording head to move until the signal detection means detects a presence of two adjacent unrecorded tracks in the frame recording mode.

2. An image recording device according to claim 1 wherein the recording disk is a magnetic disk and the recording head includes an inner head and an outer head, and the signal detection means detects whether a track is unrecorded or not based on the signal reproduced by the inner head of the recording head.

3. An image recording device according to claim 1 further comprising manual operation means operable for moving the recording head to a recordable track manually.

4. An image recording device which records an image signal on a recording disk having a multiplicity of concentric annular recording tracks and is selectively operable in a frame recording mode in which one frame of a single image is recorded on two adjacent tracks of the recording disk and in a field recording mode in which one field of a single image is recorded on one track, the image recording device comprising:
- a recording head for recording an image signal and reproducing a signal recorded on the recording disk;
- head feeding means for moving the recording head in a radial direction of the recording disk;
- selection means for selecting either of the frame recording mode and the field recording mode;
- a controller for controlling the head feeding means so as to move the recording head track by track when the image signal is to be recorded; and
- signal detection means for determining whether a corresponding track is unrecorded or not based on the signal reproduced by the recording head very time the recording head is moved by one track;
- wherein the controller causes the recording head to move until the signal detection means detects one unrecorded track when the field recording mode is selected and to move until the signal detection means detects a presence of two adjacent unrecorded tracks when the frame recording mode is selected.

5. An image recording device according to claim 4 wherein the recording disk is a magnetic disk and the recording head includes an inner head and an outer head, and the signal detection means detects whether a track is unrecorded or not based on the signal reproduced by the inner head of the recording head.

6. An image recording device which records an image signal on a recording disk having a multiplicity of concentric annular recording tracks and is selectively operable in a frame recording mode in which one frame of a single image is recorded on two adjacent tracks of the recording disk and in a field recording mode in which one field of a single image is recorded on one track of the recording disk, the image recording device comprising:
- a recording head for recording an image signal and reproducing a signal recorded on the recording disk;
- head feeding means for moving the recording head in a radial direction of the recording disk;
- selection means for selecting either of the frame recording mode and the field recording mode;
- a first controller for controlling the head feeding means so as to move the recording head track by track; and
- signal detection means for determining whether a track is unrecorded or not based on the signal reproduced by the recording head;
- wherein the first controller receives an output of the signal detection means indicative of the recording state of a track and changing the recording mode to the field recording mode automatically when the frame recording mode is selected and the signal detection means detects a single unrecorded track between recorded tracks; and wherein the image recording device operates in the frame recording mode when the frame recording mode is manually selected by the selection means after the recording mode has been automatically changed to the field recording mode by the first controller.

7. An image recording device according to claim 6 wherein the selection means includes a push-button switch for changing the recording mode at every push.

8. An image recording device according to claim 6 wherein the first controller allows the recording head to move until the signal detection means detects presence of two adjacent unrecorded tracks when the recording mode is manually changed to the frame recording mode after being automatically changed to the field recording mode.

9. An image recording device according to claim 6 further comprising a second controller for controlling the head feeding means so as to allow the recording head to move until the signal detection means detects a single unrecorded track when the field recording mode is selected, and controlling the head feeding means so as to allow the recording head to move until the signal detection means detects presence of two adjacent unrecorded tracks when the frame recording mode is selected; and
- shifting means for shifting between the first controller and the second controller.

10. An image recording device according to claim 6 wherein the recording disk is a magnetic disk and the recording head includes an inner head and an outer head, and the signal detection means detects whether a track is unrecorded or not based on the signal reproduced by the inner head of the recording head.

11. An image recording device which records an image signal on a recording medium having a multiplicity of recording regions and is operable in a frame recording mode in which one frame of a single image is recorded on two adjacent regions of the recording medium, the image recording device comprising:
- recording means for recording an image signal and reproducing a signal recorded on the recording medium;
- means for designating regions of the recording medium one by one;
- signal detection means for determining whether a designated region is unrecorded or not based on the signal reproduced by the record means every time the designating means designates one region; and
- a controller for controlling the designating means to designate regions of the recording medium one by one until the signal detection means detects presence of two adjacent unrecorded regions in the frame recording mode.

* * * * *